(12) United States Patent
Kara-Ivanov et al.

(10) Patent No.: US 9,407,434 B2
(45) Date of Patent: Aug. 2, 2016

(54) SECRETS RENEWABILITY

(71) Applicant: Cisco Technology, Inc., San Jose, CA (US)

(72) Inventors: Michael Kara-Ivanov, Maale Adumim (IL); Aviad Kipnis, Efrat (IL); Tzachy Reinman, Elazar (IL); Efraim Mangell, Jerusalem (IL); Erez Waisbard, Or-Yehuda (IL); Yaacov Belenky, Maaleh Adumim (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/759,417

(22) PCT Filed: Jul. 10, 2013

(86) PCT No.: PCT/IB2013/055658
§ 371 (c)(1),
(2) Date: Jul. 7, 2015

(87) PCT Pub. No.: WO2014/106781
PCT Pub. Date: Jul. 10, 2014

(65) Prior Publication Data
US 2015/0358160 A1 Dec. 10, 2015

(30) Foreign Application Priority Data
Jan. 7, 2013 (IL) .......................................... 224129

(51) Int. Cl.
*H04L 9/08* (2006.01)

(52) U.S. Cl.
CPC ............ *H04L 9/0861* (2013.01); *H04L 9/0869* (2013.01)

(58) Field of Classification Search
None
See application file for complete search history.

(56) References Cited

U.S. PATENT DOCUMENTS 5,649,014 A 7/1997 Koopman, Jr. et al.
5,696,827 A 12/1997 Brands (Continued)

FOREIGN PATENT DOCUMENTS

WO 2006/023334 3/2006
WO 2010/100015 9/2010

OTHER PUBLICATIONS

International Search Report and Written Opinion, Feb. 4, 2014.
(Continued)

*Primary Examiner* — Kaveh Abrishamkar
(74) *Attorney, Agent, or Firm* — Samuel M. Katz

(57) ABSTRACT

A method, system and apparatus for deriving a secondary secret from a root secret are described, the method, system and apparatus including reserving a memory buffer included in an integrated circuit, the memory buffer being large enough to contain all of the bits which will include the secondary secret, receiving a plurality of bits from a root secret, the root secret being stored in a secure memory of the integrated circuit, inputting the plurality of bits from the root secret and at least one control bit into a permutation network, and thereby producing a multiplicity of output bits, the at least one control bit including one of one bit of a value g, and one bit an output of a function which receives g as an input, receiving the multiplicity of output bits from the permutation network, inputting the multiplicity of output bits from the permutation network into a plurality of logic gates, thereby combining the multiplicity of output bits, wherein a fixed number of bits is output from the logic gates, inputting the fixed number of bits output by the logic gates into an error correcting code module, the fixed number of bits output by the logic gates including a first group of intermediate output bits and a second group of intermediate output bits and receiving output bits from the error correcting code module, the output bits of the error correcting code module including the first group of intermediate output bits as changed by the error correcting code module, where the change depends on the second group of intermediate output bits, filling non-filled registers in the reserved memory buffer with the first group of intermediate output bits as changed by the error correcting code module, and repeating the steps of "receiving a plurality of bits from a root secret" through "filling non-filled registers in the reserved memory buffer" until the entire secondary secret is derived, wherein the steps of "receiving a plurality of bits from a root secret" through "filling non-filled registers in the reserved memory buffer" are performed in a single clock cycle of the integrated circuit. Related apparatus, methods and systems are also described.

13 Claims, 6 Drawing Sheets

(56) References Cited

U.S. PATENT DOCUMENTS

| | | | |
|---|---|---|---|
| 6,195,671 B1* | 2/2001 | Ito | G06F 3/0233 |
| | | | 708/131 |
| 6,363,485 B1 | 3/2002 | Adams et al. | |
| 7,051,211 B1 | 5/2006 | Matyas, Jr. et al. | |
| 7,620,186 B2 | 11/2009 | Sozzani et al. | |
| 8,155,320 B2 | 4/2012 | Takayama | |
| 2002/0071558 A1* | 6/2002 | Patel | H04W 12/04 |
| | | | 380/270 |
| 2007/0230705 A1 | 10/2007 | Hanaoka | |
| 2008/0049940 A1 | 2/2008 | Kocher | |
| 2009/0067630 A1 | 3/2009 | Daemen et al. | |
| 2009/0307499 A1* | 12/2009 | Senda | H04L 9/0861 |
| | | | 713/187 |
| 2011/0002461 A1 | 1/2011 | Erhart et al. | |
| 2014/0041040 A1* | 2/2014 | Potkonjak | G06F 21/64 |
| | | | 726/26 |
| 2014/0098953 A1* | 4/2014 | Dellow | G06F 21/575 |
| | | | 380/44 |
| 2015/0006913 A1* | 1/2015 | Daniel | G06F 21/602 |
| | | | 713/193 |

OTHER PUBLICATIONS

Becker, Anja; Decoding Random Binary Linear Codes in 2N/20: How 1+1=0 Improves Information Set Decoding, (2012).
Meurer, Alexander; Improved Information Set Decoding; Ruhr-Universitaet Bochum, CBC Workshop 2012, Lyngby.
SMI IP Protection and Anti-Tamper Technologies; Circuit Camouflage Technology; Version 1.9.8j—Mar. 2012.
SMI Syphermedia; SMI Solutions, (2010).
Waksman, Abraham; A Permutation Network, (1968).

* cited by examiner

SECRETS RENEWABILITY

The present application is a 35 USC §371 application of PCT/IB2013/055658, of NDS Limited, filed on 10 Jul. 2013 and entitled "Secrets Renewability", which was published in the English language with International Publication Number WO2014/106781 on 10 Jul. 2014, and which claims the benefit of priority from IL Patent Application IL 224129 of NDS Limited, filed 7 Jan. 2013.

FIELD OF THE INVENTION

The present invention relates to device secrets and more particularly to replacing compromised device secrets.

BACKGROUND OF THE INVENTION

"A Permutation Network", by Abraham Waksman, Stanford Research Institute, Menlo Calif., available on the Internet at www.cs.gsu.edu/~wkim/index_files/permutation_network.pdf, describes the construction of a switching network capable of n!-permutation of its n input terminals to its n output terminals. The building blocks of this network are binary cells capable of permuting their two input terminals to their two output terminals.

"Decoding Random Binary Linear Codes in $2^{n/20}$: How $1+1=0$ Improves Information Set Decoding", by Anja Becker, Antoine Joux, Alexander May, and Alexander Meurer, published in EuroCRYPT 2012, and available on the Internet at eprint.iacr.org/2012/026.pdf, describes recent progress in improving the running time of the best decoding algorithms for binary random codes. The paper is summarized in a slide show, also available on the Internet at cbc2012.mat.dtu.dk/slides/Meurer.pdf.

The following patents and patent applications are believed to reflect the state of the art:
U.S. Pat. No. 8,155,320 to Takayama;
U.S. Pat. No. 7,620,186 to Sozzani, et al.;
U.S. Pat. No. 7,051,211 to Matyas, et al.;
U.S. Pat. No. 5,696,827 to Brands;
US 2009/0067630 of Daemen, et al;
US 2008/0049940 of Kocher; and
US 2007/0230705 of Hanaoka, et al.

SUMMARY OF THE INVENTION

The present invention, in certain embodiments thereof, seeks to provide an improved method and system for generating a new secret for a device.

There is thus provided in accordance with an embodiment of the present invention a method for deriving a secondary secret from a root secret, the method including (a) reserving a memory buffer included in an integrated circuit, the memory buffer being large enough to contain all of the bits which will include the secondary secret, (b) receiving a plurality of bits from a root secret, the root secret being stored in a secure memory of the integrated circuit, (c) inputting the plurality of bits from the root secret and at least one control bit into a permutation network, and thereby producing a multiplicity of output bits, the at least one control bit including one of one bit of a value g, and one bit an output of a function which receives g as an input, (d) receiving the multiplicity of output bits from the permutation network, (e) inputting the multiplicity of output bits from the permutation network into a plurality of logic gates, thereby combining the multiplicity of output bits, wherein a fixed number of bits is output from the logic gates, (f) inputting the fixed number of bits output by the logic gates into an error correcting code module, the fixed number of bits output by the logic gates including a first group of intermediate output bits and a second group of intermediate output bits and receiving output bits from the error correcting code module, the output bits of the error correcting code module including the first group of intermediate output bits as changed by the error correcting code module, where the change depends on the second group of intermediate output bits, (g) filling non-filled registers in the reserved memory buffer with the first group of intermediate output bits as changed by the error correcting code module, and (h) repeating steps b-g until the entire secondary secret is derived, wherein steps b-g are performed in a single clock cycle of the integrated circuit.

Further in accordance with an embodiment of the present invention the plurality of logic gates includes a plurality of xor-gates.

Still further in accordance with an embodiment of the present invention inputting the plurality of bits from the root secret and the at least one control bit into a permutation network includes inputting two bits of the plurality of bits from the root secret along with one bit of the at least one control bit into each one box of a plurality of boxes including layer one of the permutation network, and inputting two output bits from a previous layer of the permutation network along with one bit of the at least one control bit into each one box of a plurality of boxes including one layer of each layer after layer one of the permutation network.

Additionally in accordance with an embodiment of the present invention the error correcting code module includes one of a Hamming(7, 4) error correcting code module, a Reed-Muller error correction code module, a Reed-Solomon error correction code module, and a Hamming(15, 11) error correction code module.

Moreover in accordance with an embodiment of the present invention the value g is received from a headend, thereby ensuring that the headend and the integrated circuit use the same value g to derive the secondary secret.

Further in accordance with an embodiment of the present invention the function which receives g as an input includes a hash function, g being input into the hash function prior to being input into the permutation network.

Still further in accordance with an embodiment of the present invention the function which receives g as an input includes a control circuit which includes the same number of levels as the permutation network, the control circuit receiving the bits which include g as input bits, and output a bit value which is input as the control bit to a parallel level included in the permutation network.

Additionally in accordance with an embodiment of the present invention the function which receives g as an input includes a hash function and the control network, g being input into a hash function, the output of the hash function being input into the control network, the control network outputting a bit value which is input as the control bit to a parallel level included in the permutation network.

Moreover in accordance with an embodiment of the present invention additional arbitrarily selected bits include additional inputs to both of the error correction module and the hash function.

Further in accordance with an embodiment of the present invention and including inputting a plurality of arbitrarily selected bits as additional inputs to the hash function and also as additional inputs to the error correcting code module.

Still further in accordance with an embodiment of the present invention a device including apparatus operative to execute the method described herein.

Additionally in accordance with an embodiment of the present invention a headend including apparatus operative to execute the method of described herein.

There is also provided in accordance with another embodiment of the present invention a system for deriving a secondary secret from a root secret, the system including (a) a reserved memory buffer included in an integrated circuit, the memory buffer being large enough to contain all of the bits which will include the secondary secret, (b) a plurality of bits which are received from a root secret, the root secret being stored in a secure memory of the integrated circuit, (c) a permutation network into which the plurality of bits from the root secret and at least one control bit are input, thereby producing a multiplicity of output bits, the at least one control bit including one of one bit of a value g, and one bit an output of a function which receives g as an input, (d) a plurality of logic gates which receive the multiplicity of output bits from the permutation network and into which the multiplicity of output bits from the permutation network are input, thereby combining the multiplicity of output bits, wherein a fixed number of bits is output from the logic gates, (e) an error correcting code module into which the fixed number of bits output by the logic gates are input, the fixed number of bits output by the logic gates including a first group of intermediate output bits and a second group of intermediate output bits and receiving output bits from the error correcting code module, the output bits of the error correcting code module including the first group of intermediate output bits as changed by the error correcting code module, where the change depends on the second group of intermediate output bits, (f) a plurality of registers in the reserved memory buffer of which non-filled registers are filled with the first group of intermediate output bits as changed by the error correcting code module, and (g) wherein the apparatus described in b-f is invoked the entire secondary secret is derived, wherein invoking the apparatus described in b-f is performed in a single clock cycle of the integrated circuit.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
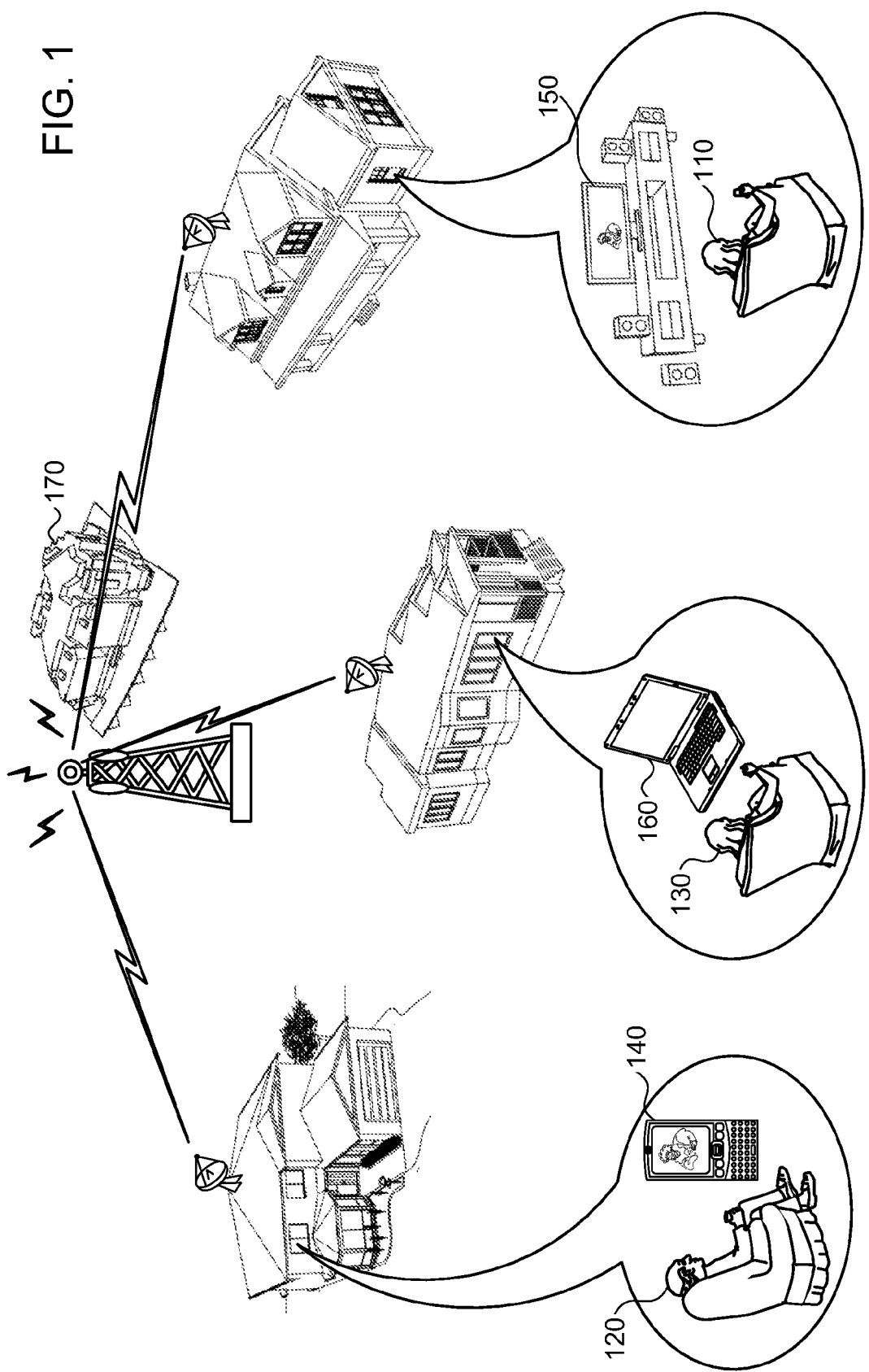
FIG. 1 is a simplified pictorial illustration of a plurality of users, each of which is using a device constructed and operative in accordance with an embodiment of the present invention.

Reference is now made to FIG. 1, which is a simplified pictorial illustration of a plurality of users, each of which is using a device constructed and operative in accordance with an embodiment of the present invention. In FIG. 1, three users, Alice 110, Bob 120, and Eve 130 are all depicted using a device 140, 150, 160, to utilize content. The devices 140, 150, 160 are depicted as systems comprising smart cards, set top boxes (in order to view television programming), and/or other systems comprising integrated circuits with security components. However, those of skill in the art will appreciate that any device comprising secrets which are used in securing content or any other securable data item may be a device in which embodiments of the present invention may be implemented.

In FIG. 1 two of the users depicted, Alice 110 and Bob 120 are legitimate users, abiding by all applicable laws, rules and license agreements which are invoked by their using the devices 140, 150, for consuming the content. However, Eve 130 is an attacker, who attempts to circumvent the applicable laws, rules and license agreements which are invoked by her use of her device 160. Eve's attack on the device 160 may include, but not be limited to, attempts to gain access to secrets stored on the device 160. Such secrets might be used as cryptographic keys for encryption/decryption of the content to be utilized on the devices 140, 150, 160, or for other cryptographic uses, as are known in the art.

Once Eve gains access to one of the secrets stored on the device 160, Eve is able to distribute the secret over the Internet, thereby making the one of the secrets available to Alice 110 and Bob 120, as well as Mallory (not depicted) and any other users of similar devices. Any one of Alice 110, Bob 120, Mallory (not depicted), and any of the other users might obtain the secret over the Internet and use the secret to gain access to the content. This method of making illegally acquired secrets available over the Internet is known as key sharing.

It is appreciated that the secret Eve wants to share over the Internet is typically a temporary (secondary) secret, and the secret that Eve wants to gain access to is a permanent (root) secret. More generally, secret sharing is only one of several possible goals of gaining access to the permanent root secret. Other potential goals include, but are not limited to:

producing clones of the device, (or its hardware or software); and gaining knowledge of device secrets which will aid in searching for and/or exploiting device secret vulnerability (for instance if the device is running programming code which is encrypted and/or signed with a compromised key).

Accordingly, it is desirable to have a way to recover from such an attack by being able to proactively replace revealed secrets with replacement secrets. It is further desirable to have the new replacement secret not be derivable from the old compromised secret. Additionally, the new replacement secret must also be available to a headend 170, a content item provider, or a provider of security which protects the content items in the system. Furthermore, given that the cost of serialization of chips (such as, but not limited to, smart card chips, set top box security chips, and security chips for other devices, such as laptops, tablet computing devices and smart phones) is an expensive and complex operation, it is desirable to have a capability to use a dormant feature of these security chips to generate replacement secrets inside chips which are already in the field without needing to replace the compromised chips.

Figure 2:
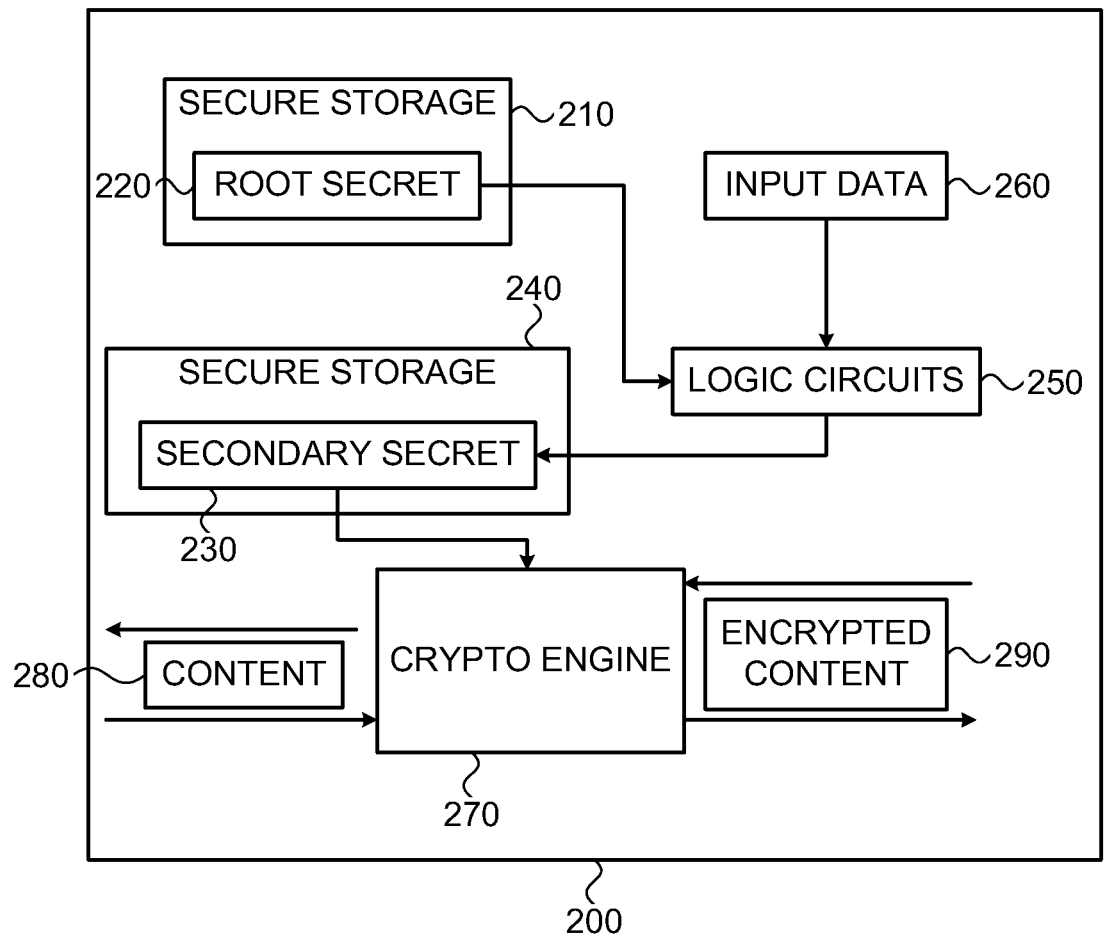
FIG. 2 is a simplified high level block diagram of an integrated circuit comprised in any of the devices of FIG. 1.

Reference is now made to FIG. 2, which is a simplified high level block diagram of an integrated circuit 200 comprised in any of the devices of FIG. 1. Each device 140, 150, 160 comprises an integrated circuit 200 comprising a secure storage 210 comprising at least one root secret 220. It is appreciated that the integrated circuit 200 may be comprised directly in the device 140, 150, 160, or, alternatively, the integrated circuit 200 may be embodied in a removable security element, such as, but not limited to a smart card. The term "secure storage" is understood to refer to a memory or any other apparatus or technique to permanently store information, which is, in the opinion of the inventors of the present invention, immune to state of the art reverse engineering techniques. For example, and without limiting the generality of the foregoing, a special cell may be used to store the root secret. A cell, cell A, is considered a special cell if the layout of cell A is identical to a second cell, cell B, when the two cells are viewed under a microscope, but the logical function of cell A differs from the logical function of cell B.

A plurality of secondary secrets 230 are derived from the root secret 220 in such a way that even if one or more secondary secrets 230 are compromised then the attacker who has compromised the one or more secondary secrets 230 is not able to obtain any further information about the root secret 220 from the compromised secondary secret(s) 230. Neither is the attacker able to obtain any other past and/or future secondary secret 230 which is derived from the same root secret 200 as is the compromised secondary secret 230. Only secondary secrets 230 are used by components and algorithms in the device 140, 150, 160. If the secondary secret 230 is compromised, using embodiments of the present invention, a new secondary secret 230 can be derived from the root secret 220 and used to replace the compromised secondary secret 230.

The root secret 220 is only used for secure derivation of the secondary secrets 230. Any other use of the root secret 220 would entail exposing the root secret 220 to an undue and unacceptable risk of being revealed.

The secondary secret 230 is stored in storage 240, the storage 240 typically comprising long-term memory which is comprised in the integrated circuit. It is appreciated that the storage 240 may also comprise secure storage (in addition to the secure storage 210). (It is appreciates that in this case, "secure" is by way of comparison, being relative to other less secure in-circuit memory.) However, typically, the storage 240 is less secure than the secure storage 210.

The integrated circuit 200 also comprises logic circuits 250, described below in greater detail, with reference to FIGS. 3-6. The logic circuits 250 receive the root secret 220 and an input data 260 in order to produce the secondary secret 230, as will be described below.

At a later stage, the stored secondary secret 230 is used by the integrated circuit 200 in a cryptographic engine 270 comprised in the integrated circuit 200 as a cryptographic key to encrypt non-encrypted content 280 and/or decrypt encrypted content 290; additionally, the secondary secret 230 may be used in other cryptographic functions, such as use in signatures, hash functions, and so forth, as is known in the art.

The process of deriving the secondary secret 230 from the root secret 220 is performed such that no information about the root secret 220 is stored in the flip-flops (not depicted) of the integrated circuit 200. Only the derived secondary secret 230 is stored in the flip-flops (not depicted).

Because the root secret 220 is not stored in the flip-flops (not depicted) of the integrated circuit 200, the secondary secret 230 is derived from the root secret 220 in one CPU cycle of the integrated circuit 200. Similarly, all intermediate steps for deriving the secondary secret 230 are performed within the one CPU cycle of the integrated circuit 200.

As noted above, embodiments of the present invention require at least two entities: the headend 170 and the integrated circuit 200. Each of the two entities, the headend 170 and the integrated circuit 200 have corresponding circuitry that enables both of the two entities to derive the secondary secret 230 from the root secret 220. In order to enable the two entities to use the secondary secret 230 as a shared cryptographic secret, the corresponding circuitry for deriving the secondary secret 230 work in parallel. That is to say that if a new secondary secret 230 is derived on any one of the devices 140, 150, 160, then the same new secondary secret 230 is correspondingly derived at the headend 170. Given the same input data 260 the headend 170 derives the same secondary key 230 as one device (e.g. device 140). In short, the secondary key 230 should be coordinated between the headend 170 and the device 140, but it is possible (and this is the normal case) that the headend 170 and device 140 share one secondary key 230, the headend 170 and device 150 share another secondary key 230, and so on. A consequence of this is that the input data 260 to the logic circuits 250 of the integrated circuits comprised in each one of the devices 140, 150, 160 on an individual basis is the same as the input data 260 to the logic circuits 250 of the integrated circuits comprised in the headend 170. One way of ensuring that the input data 260 is the same input data 260 in both the devices 140, 150, 160 and the headend 170 is for the headend 170 to send the input data 260 to the devices 140, 150, 160, for input to their respective integrated circuits 200.

By way of introduction to what follows, bits of the input data 250 and bits of the root secret 220 are first input, as will be explained below, into a permutation network (see the explanation of FIG. 3, below). The output of the permutation network is input into logic circuits (such as, but not limited to XOR circuits), and finally, the output of the logic circuits is input into error correction functions (see the explanation of FIGS. 5 and 6, below).

A function, hereinafter f(g, R), is implemented in both the integrated circuits 200 comprised in the devices 140, 150, 160 and the headend 170 which meets at least the following requirements:
1. For any given value g, the function f(g, R) is a linear function of R; and
2. A small change (for example a 1-bit change) in g causes a big change (i.e. approximately half of the bits) in f(g, R).

Additionally, if there is a change of one or more input bit, then any one of the output bits will be changed approximately half of the time.

The inventors of the present invention are of the opinion that the function f(g, R) may be built with a permutation network (as described in "A Permutation Network", by Abraham Waksman, Stanford Research Institute, Menlo, Calif., available on the Internet at www.cs.gsu.edu/~wkim/index_files/permutation_network.pdf) which enables the function f(g, R) to meet the above mentioned requirements, once appropriate requirements (as discussed below) of the control bits are implemented. Other appropriate permutation networks, as are known in the art, may be used as well.

Figure 3:
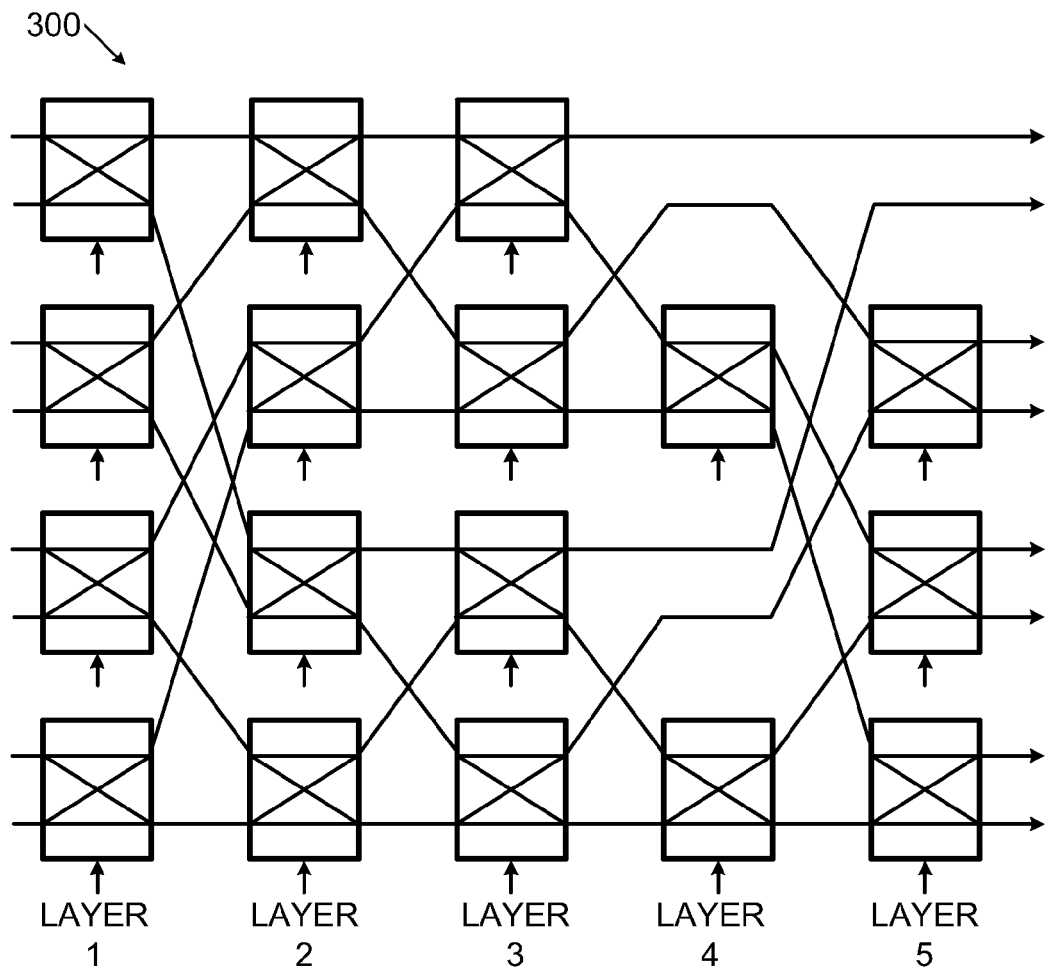
FIG. 3 is a simplified drawing of a permutation network for use in the devices and the headend 170 of FIG. 1.

Reference is now made to FIG. 3, which is a simplified drawing of a permutation network for use in the devices 140, 150, 160 and the headend 170 of FIG. 1. The permutation network 300 is built from several layers of identical logic circuits, each box of the plurality of boxes depicted in the permutation network 300 representing one of the identical logic circuits.

Reference is now additionally made to FIG. 4, which is a simplified drawing of a single logic circuit 400 (a "box") in the permutation network of FIG. 3. Each of the identical logic circuits 400 (boxes) is constructed such that the logic circuit 400 receives a one-bit control input, denoted C. Additionally, each of the identical logic circuits 400 receives a two-bit data input, each bit of the two-bit data input denoted, respectively, $I_1$ and $I_2$. Furthermore, each of the identical logic circuits 400 outputs a two-bit data output, each bit of the two-bit data output denoted, respectively, $O_1$ and $O_2$. The following rule is the rule underlying the relationship between the input data and the output data of each of the identical logic circuits 400:

If C=0, then $O_1=I_1$ and $O_2=I_2$; Otherwise $O_1=I_2$ and $O_2=I_1$.

Figure 4A:
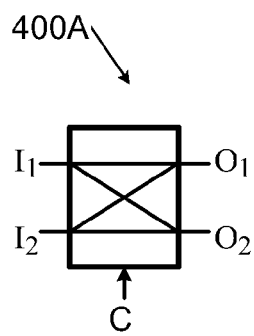
FIG. 4A is a simplified drawing of a single logic circuit (a "box") in the permutation network of FIG. 3.
Figure 4B:
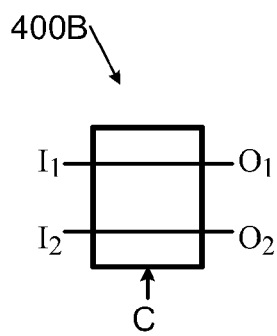
FIG. 4B is a simplified drawing of one method of operation of the single logic circuit of FIG. 4A.
Figure 4C:
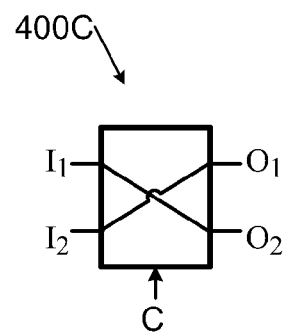
FIG. 4C is a simplified drawing of an alternative method of operation of the single logic circuit of FIG. 4A.

Reference is now further additionally made to FIGS. 4B and 4C.

FIG. 4B is a simplified drawing of one method of operation of the single logic circuit 400A of FIG. 4A, and FIG. 4C is a simplified drawing of an alternative method of operation of the single logic circuit 400B of FIG. 4A. In the embodiment of the single logic circuit 400A of FIG. 4A depicted in FIG. 4B, C=0, and therefore $O_1=I_1$ and $O_2=I_2$. In the embodiment of the single logic circuit 400C of FIG. 4A depicted in FIG. 4C, C=1, and therefore, $O_1=I_2$ and $O_2=I_1$. Persons of skill in the art will appreciate that for the purposes of implementation of the permutation network 300, this is equivalent to:

If C=0, then $O_1=I_1$ and $O_2=I_2$; Otherwise $O_1=I_2$ and $O_2=I_1$.

The permutation network 300 will meet the requirements, stated above:
1. For any given value g, the function f(g, R) is a linear function of R; and
2. A small change (for example a 1-bit change) in g causes a big change in f(g, R).

It is also appreciate that if R is 256 bits long, then 32 instantiations of permutation networks such as the one depicted in FIG. 3 may be needed, or one such permutation network may need to be used thirty two times. Rather, it may be preferable, in some embodiments of the present invention, to use a similar permutation network scheme with 256 bits of R as input and ten layers that mixes the 256 bits of R all together.

Taking the function defined above, f(g, R), the root secret 220 serves as a data input (i.e. $I_1$ and $I_2$) of the permutation network 300. That is to say that root secret 220 corresponds to R in the function. Input data 260, corresponding to g in the function f(g, R), provides the one-bit control input, denoted C in the discussion of the permutation network 300.

Figure 5:
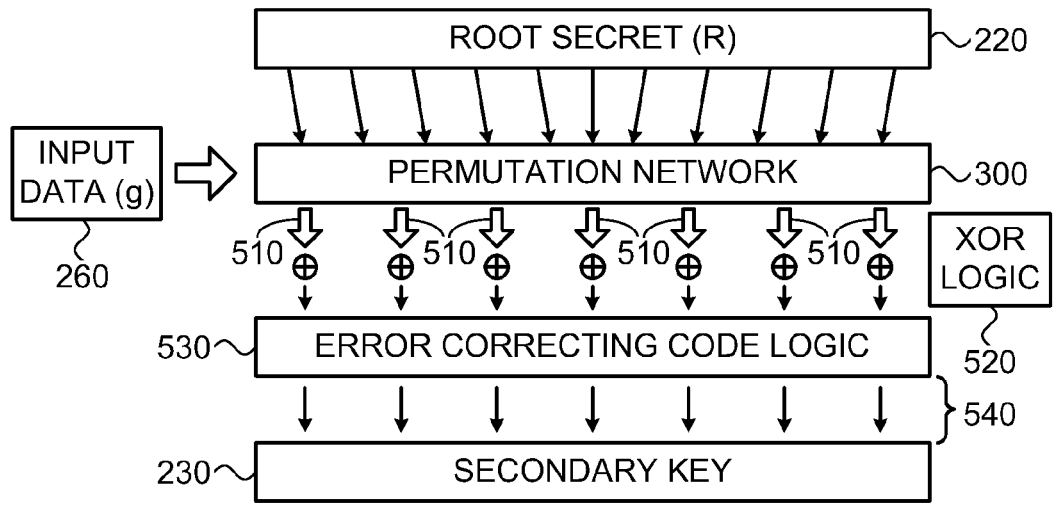
FIG. 5 is a simplified diagram, depicting the flow of data in the devices of FIG. 1, operative to produce a secondary key.

Reference is now additionally made to FIG. 5, which is a simplified diagram, depicting the flow of data in the devices of FIG. 1, operative to produce a secondary key.

In the simplest implementation of the embodiment of the present invention described herein, every bit of g is used as the control bit C of several boxes (for instance by duplication, as will be apparent to a person of skill in the art).

The outputs $O_1, O_2, \ldots$ of the permutation network 300 are partitioned into n non-disjoint groups of bits, and, as will be explained below with reference to FIGS. 5 and 6, each of the bits in each group are XORed, or combined in any other fashion, such as, and not limited to, other logical operations, such as AND, OR, and NOT, in combination, thereby giving an n-bit result. Persons of skill in the art will appreciate that either AND or OR alone is generally not used to combine several bits using either AND or OR alone the result will be severely biased to 0.

For the purpose of the following discussion, assume that f(g, R) returns 7 bits.

Persons of skill in the art will appreciate that if an attacker were to know the circuitry which implements the function f(g, R) and input many different inputs $g_i$, corresponding outputs $f(g_i, R)$ (i.e. secondary secrets 230) but does not know the root secret 220, then in order to find the root secret 220, the attacker would have to solve a system of linear equations with errors. Solving a system of linear equations with errors is a known in the field of error correction codes to be a computationally difficult problem. See Decoding Random Binary Linear Codes in $2^{n/20}$: How 1+1=0 Improves Information Set Decoding, which is available on the Internet at eprint.iacr.org/2012/026.pdf, and summarized in the slides presented at Crypto 2012, also available on the Internet at cbc2012.mat.dtu.dk/slides/Meurer.pdf.

Accordingly, the output of the logic gates (i.e. the XOR gates or the combination of the AND, OR, and NOT gates) are input into an error correction module (Hamming 7,4, in the example below). Inputting the output of the logic gates into the error correction module (refer to item 530 in FIG. 5, below) produces, as it were, "errors" in the output of the logic gates, thereby effectively turning the output bits into a system of linear equations with errors.

In order to produce a part of the secondary secret 230, the headend 170 chooses a random or pseudo-random value for input data 260 $g_0$, and calculates $f(g_0, R)$. In the resulting 7-bit value, up to one bit may be changed, in order that for the result: $b_1b_2b_3b_4b_5b_6b_7$ the following conditions hold:

$b_1 \oplus b_3 \oplus b_5 \oplus b_7 = 0$ $b_2 \oplus b_3 \oplus b_6 \oplus b_7 = 0$ $b_4 \oplus b_5 \oplus b_6 \oplus b_7 = 0$ The above example is an implementation of the well-known Hamming code (7, 4).

The seven output bits of the logic gates which are input to the error correction module are effectively divided into two different groups of intermediate bits: a first group of four intermediate output bits: $b_3b_5b_6b_7$ 540; and a second group of three intermediate output bits: $b_1b_2b_4$ It will be appreciated by those skilled in the art that some bits of the first group of intermediate output bits may be changed by the error correcting code.

A memory buffer is set aside to contain all of the bits which will eventually form the secondary secret 230. The four bits $b_3b_5b_6b_7$ are used to fill non-filled registers in the reserved memory buffer. It is appreciated that the remaining three bits, $b_1b_2b_4$ are parity/error correction bits. Those of skill in the art will appreciate that the above-described derivation of $b_3b_5b_6b_7$ from $b_1b_2b_3b_4b_5b_6b_7$ typically after a 1-bit correction, is, as noted above, an application of the Hamming code (7, 4) error correction code that codes 4-bit values using 7-bits, and is capable of correcting an error in 1-bit.

The procedure described above is repeated until the entire secondary secret 230 is derived.

Alternatively, any other error-correction code may be used. Well known error correction codes include the Reed-Muller error correction code, and Reed-Solomon error correction code.

To summarize the discussion above, with reference to FIG. 5, the bits from the root secret 220 and input data 260 provide, respectively, inputs and control bits for the permutation network 300. The bits from the root secret 220 are R and the bits from the input data 260 are g in the function f(g, R). The output bits are input into a plurality of XOR gates 520, and XORed with each other (or input to other combinations of logic gates, as mentioned above). The bits which are output from the XOR gates 520 are input into an error correcting logic circuit 530. The first group of four intermediate output bits 540 which are output by the error correcting logic circuit 530 to fill a reserved memory register until enough bits are derived to complete the entire secondary key 230. It is appreciated that each time the first group of four intermediate output bits are derived that additional bits from g are input into the permutation network 300 as control bits.

The above discussion has focused on the headend 170 side of operation. The same operations are performed at the integrated circuit 200 comprised in the each of devices 140, 150, 160. However, in order to ensure that the value of the root secret 220 remains a secret, the hardware which performs these calculations are designed such that the calculation described above is performed in a single clock cycle of the integrated circuit. Similarly, all intermediate steps for deriving the secondary secret 230 are performed within the one single clock (CPU) cycle of the integrated circuit 200.

Figure 6:
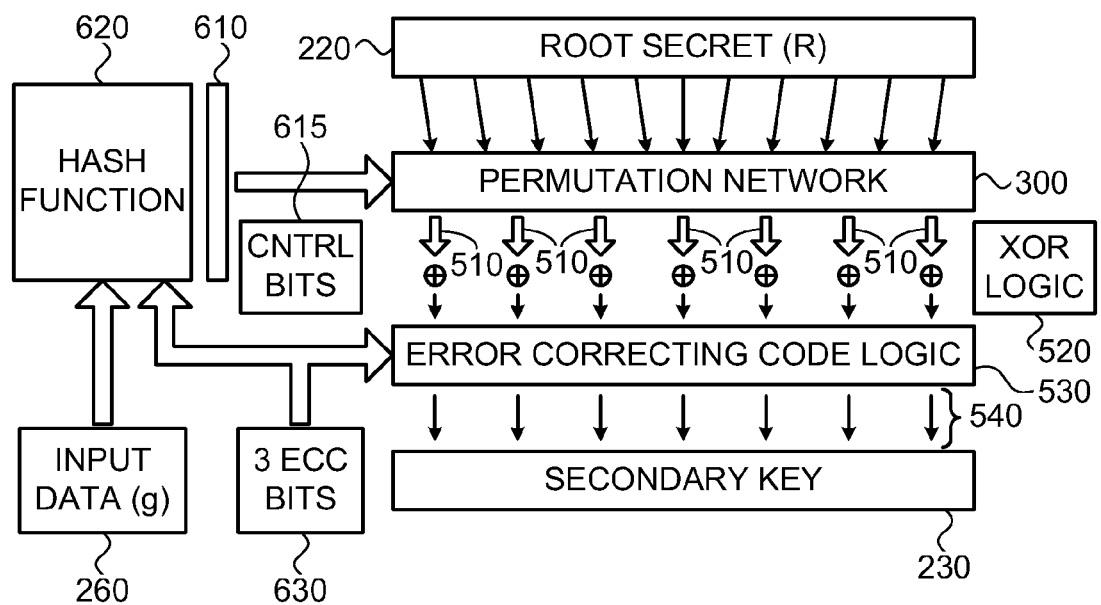
FIG. 6 is a simplified diagram, depicting an enhanced flow of data in the devices of FIG. 1, operative to produce a secondary key.

Reference is now made to FIG. 6, which is a simplified diagram, depicting an enhanced flow of data in the devices of FIG. 1, operative to produce a secondary key. FIG. 6 shows the features of FIG. 5, with additional optional enhancements to the scheme described above. It is appreciated that the additional optional enhancements depicted in FIG. 6 may be used individually, or, as depicted, together, or in any suitable combination thereof.

Outputs of functions of bits g (i.e. the data input bits) 260, rather than the bits of g themselves may be used as control inputs for the permutation network 300. For example, it is possible to build a control circuit 610 working in parallel with the permutation network 300 and having the same number of levels as the permutation network 300, where bits of g serve as inputs to the control circuit 610.

Figure 7:
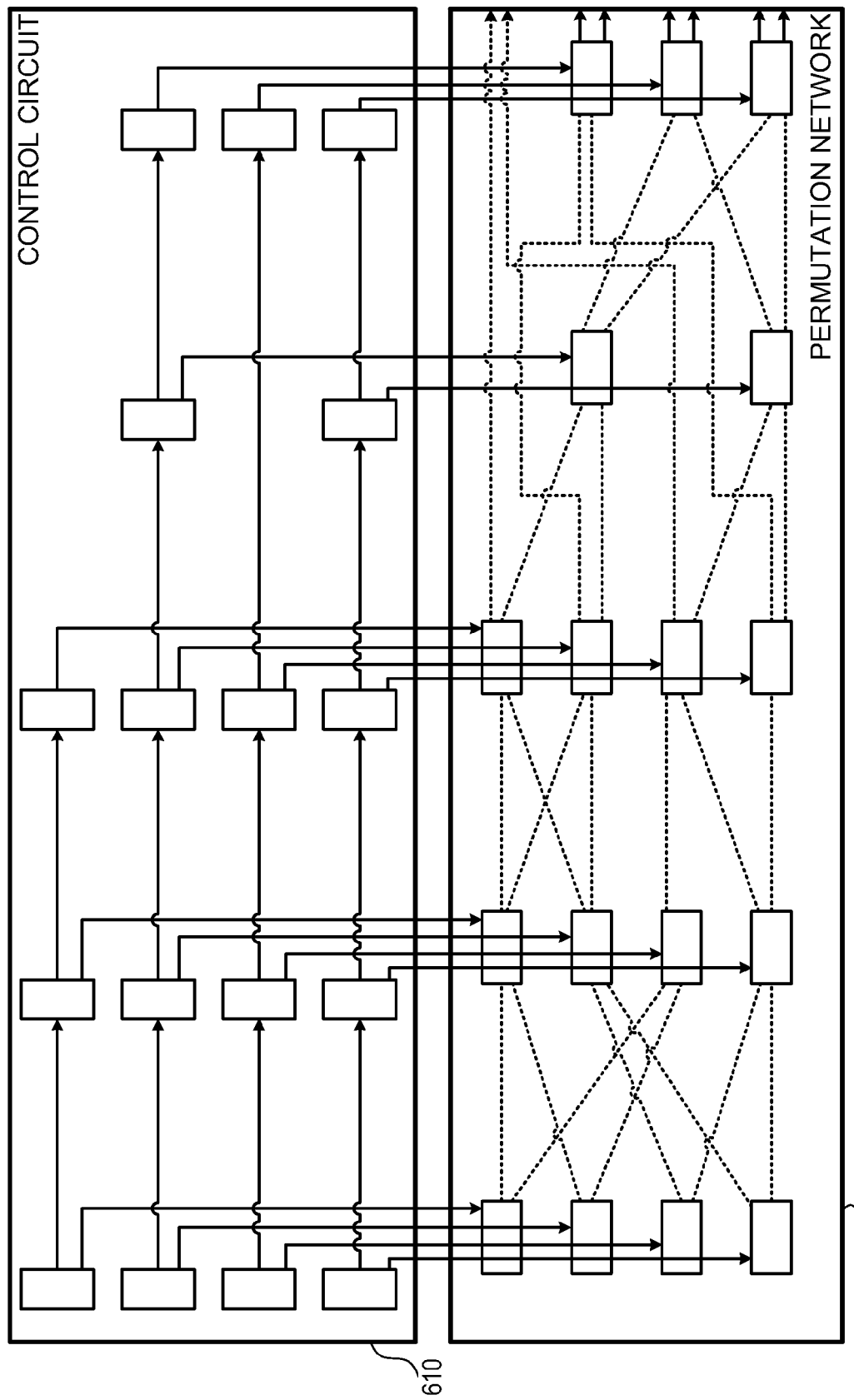
FIG. 7 is a simplified diagram depicting an embodiment of a control circuit working in parallel with the permutation network of FIG. 6.

Reference is now additionally made to FIG. 7, which is a simplified diagram depicting an embodiment of the control circuit 610 working in parallel with the permutation network of FIG. 6.

As depicted in FIGS. 6 and 7, some values from level n of the control circuit 610 serve as control inputs 615 on the corresponding same level n of the permutation network 300, and values on the level n+1 of the control circuit 610 are calculated as simple logical functions (e.g. XOR, or non-linear blocks with 3-4 inputs and outputs) of values on the levels up to n (i.e. the entry level of the control network 610 corresponds to the entry level of the permutation network 300; the following level of the control network 610 corresponds to the following level of the permutation network 300, and so forth). Those skilled in the art will appreciate that such an enhancement does not increase the length of the longest path, but makes it possible for every bit of g to affect close to half of all boxes in the permutation network.

Alternatively, rather than using the bits comprising g (i.e. the data input bits) 260 as the input to the control circuit 610, the bits comprising g may be input into a hash function 620. The output of the hash function 620 may then be input into either the control circuit 610 or, alternatively, directly into the permutation network 300. Those skilled in the art will appreciate that this makes building pairs of inputs $g_1$, $g_2$ for which functions $f(g_1,R)$ and $f(g_2,R)$ are correlated even harder (i.e. once given a non-trivial relationship between the outputs $f(g_1,R)$ and $f(g_2,R)$ it is harder to find $g_1$, $g_2$ which satisfy this relationship). The hash function 620 typically cannot be calculated in one clock cycle, so its result serving as an input to the control circuit 610 will typically be stored in flip-flops (not depicted). It is appreciated that R is selected to comprise a large enough number of bits, such as at least 256 bits, as to render a dictionary attack or other attacks directed at solving systems of linear equations with errors on the system described herein ineffective.

Still another enhancement of the method described herein has three arbitrarily chosen bits 630, $c_1$, $c_2$, and $c_3$ used, in addition to the bits comprising g (i.e. the data input bits 260) as an input to the hash function 620. In addition, the conditions for the 7 bits $b_1 b_2 b_3 b_4 b_5 b_6 b_7$ after the error correction are changed from:

$b_1 \oplus b_3 \oplus b_5 \oplus b_7 = 0$ $b_2 \oplus b_3 \oplus b_6 \oplus b_7 = 0$ $b_4 \oplus b_5 \oplus b_6 \oplus b_7 = 0$ to the following conditions:

$b_1 \oplus b_3 \oplus b_5 \oplus b_7 = c_1$ $b_2 \oplus b_3 \oplus b_6 \oplus b_7 = c_2$ $b_4 \oplus b_5 \oplus b_6 \oplus b_7 = c_3$ Those skilled in the art will appreciate that similar adaptations may be applied to other error correction schemes as well. By way of example, the following is an error correction scheme based on Hamming(15, 11):

$b_1 \oplus b_3 \oplus b_5 \oplus b_7 \oplus b_9 \oplus b_{11} \oplus b_{13} \oplus b_{15} = 0$ $b_2 \oplus b_3 \oplus b_6 \oplus b_7 \oplus b_{10} \oplus b_{11} \oplus b_{14} \oplus b_{15} = 0$ $b_4 \oplus b_5 \oplus b_6 \oplus b_7 \oplus b_{12} \oplus b_{13} \oplus b_{14} \oplus b_{15} = 0$ $b_8 \oplus b_9 \oplus b_{10} \oplus b_{11} \oplus b_{12} \oplus b_{13} \oplus b_{14} \oplus b_{15} = 0$ $b_1 \oplus b_3 \oplus b_5 \oplus b_7 \oplus b_9 \oplus b_{11} \oplus b_{13} \oplus b_{15} = c_1$ $b_2 \oplus b_3 \oplus b_6 \oplus b_7 \oplus b_{10} \oplus b_{11} \oplus b_{14} \oplus b_{15} = c_2$ $b_4 \oplus b_5 \oplus b_6 \oplus b_7 \oplus b_{12} \oplus b1_{13} \oplus b_{14} \oplus b_{15} = c_3$ $b_8 \oplus b_9 \oplus b_{10} \oplus b_{11} \oplus b_{12} \oplus b1_{13} \oplus b_{14} \oplus b_{15} = c_4$ The following 11 bits are then used as input for building the secondary secret after error correction: $b_3$, $b_5$, $b_6$, $b_7$, $b_9$, $b_{10}$, $b_{11}$, $b_{12}$, $b_{13}$, $b_{14}$, $b_{15}$ (i.e., corresponding to the first group of four intermediate output bits). It is appreciated that inducing smaller number of errors and therefore using error correction codes which correct smaller number of errors may make the system described herein more susceptible to attack. Therefore more root secret bits should be provided at the outset.

It is appreciated, however, that should the attacker be able to change the three bits used as $c_1$, $c_2$, and $c_3$ different from the three bits input to the hash function 620, then the scheme described herein can be easily broken. This is because if the attacker can perform the same calculation with eight different values of $c_1$, $c_2$, and $c_3$ entering the error correcting logic, the attacker will find five sets of bits $b_3 b_5 b_6 b_7$. One of the sets of bits $b_3 b_5 b_6 b_7$ of the five sets of bits $b_3 b_5 b_6 b_7$ will appear four times, and others sets of bits $b_3 b_5 b_6 b_7$ will appear one time each. The set that appears four times is the set of bits without correction. Collecting enough such $b_3 b_5 b_6 b_7$ sets it will be possible to build a system of linear equations without errors and solve it. Feeding the same bits $c_1$, $c_2$, and $c_3$ to the hash function prevents the attacker from performing the same calculation with different values of $c_1$, $c_2$, and $c_3$ entering the error correcting logic.

It is also appreciated that, just as state of the art secure memory is used to store the root secret so that, using methods presently known, the root secret can be made effectively undetectable, so too, the permutation network 300 error correction code logic circuits 530, the XOR logic 520 as well as the hash function 620 can all be designed as state of the art resistant to reverse engineering.

Figure 8:
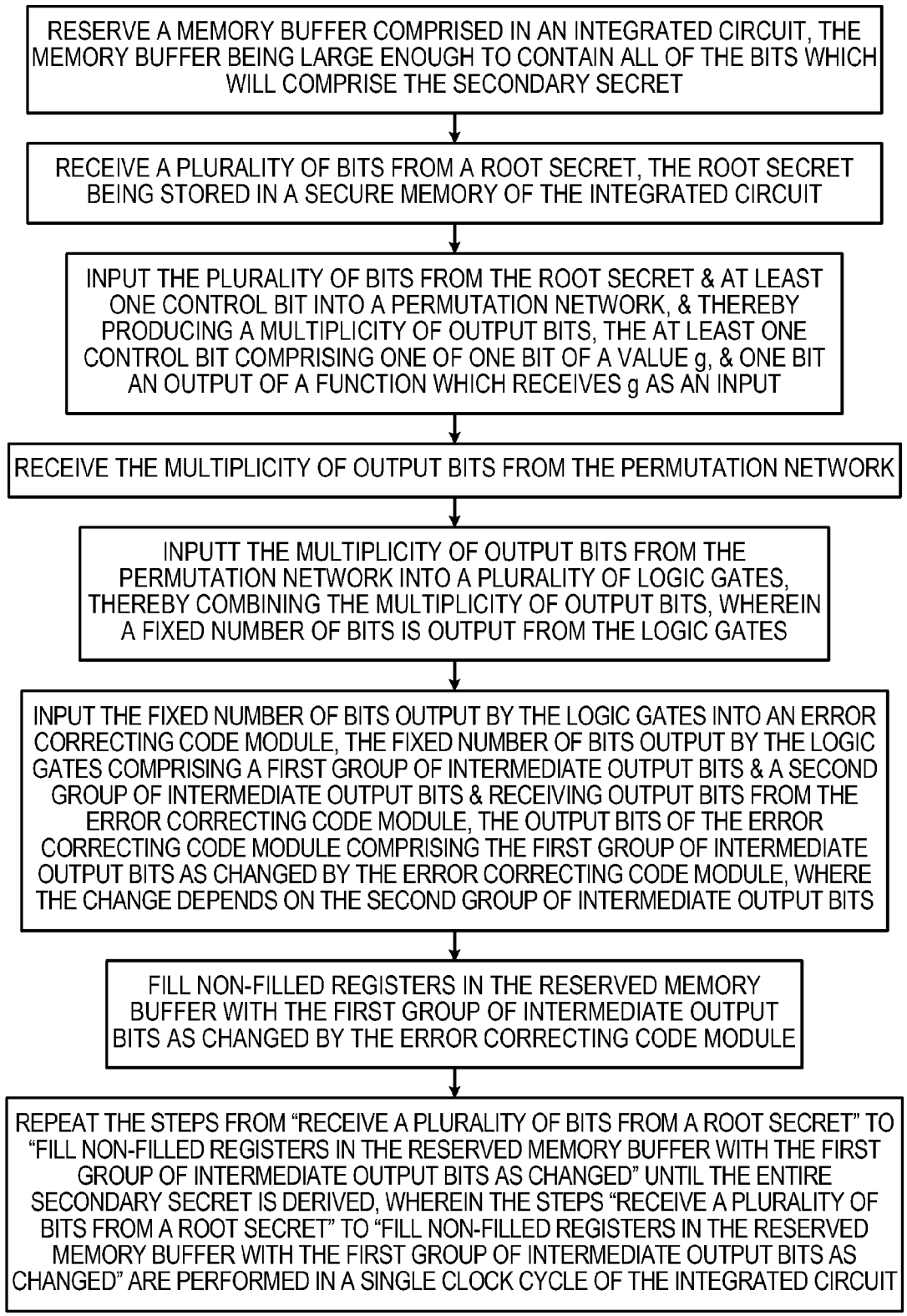
FIG. 8 is a flowchart diagram depicting a method for the embodiment of the system of FIG. 1.

Reference is now made to FIG. 8, which is a flowchart diagram depicting a method for the embodiment of the system of FIG. 1. FIG. 8 is believed to be self-explanatory in light of the above discussion.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for deriving a secondary secret from a root secret, the method comprising:
   a. reserving a memory buffer comprised in an integrated circuit, the memory buffer being large enough to contain all of the bits which will comprise the secondary secret;
   b. receiving a plurality of bits from the root secret, the root secret being stored in a secure memory of the integrated circuit;
   c. inputting the plurality of bits from the root secret and at least one control bit into a permutation network, and thereby producing a multiplicity of output bits, the at least one control bit comprising one of:
   one bit of a value g; and
   one bit an output of a function which receives g as an input;
   d. receiving the multiplicity of output bits from the permutation network;
   e. inputting the multiplicity of output bits from the permutation network into a plurality of logic gates, thereby combining the multiplicity of output bits, wherein a fixed number of bits is output from the logic gates;
   f. inputting the fixed number of bits output by the logic gates into an error correcting code module, the fixed number of bits output by the logic gates comprising a first group of intermediate output bits and a second group of intermediate output bits and receiving output bits from the error correcting code module, the output bits of the error correcting code module comprising the first group of intermediate output bits as changed by the error correcting code module, where the change depends on the second group of intermediate output bits;
   g. filling non-filled registers in the reserved memory buffer with the first group of intermediate output bits as changed by the error correcting code module; and
   h. repeating steps b-g until the entire secondary secret is derived, wherein steps b-g are performed in a single clock cycle of the integrated circuit.

2. The method according to claim 1 wherein the plurality of logic gates comprises a plurality of xor-gates.

3. The method according to claim 1 wherein inputting the plurality of bits from the root secret and the at least one control bit into a permutation network comprises:
   inputting two bits of the plurality of bits from the root secret along with one bit of the at least one control bit into each one box of a plurality of boxes comprising layer one of the permutation network; and
   inputting two output bits from a previous layer of the permutation network along with one bit of the at least one control bit into each one box of a plurality of boxes comprising one layer of each layer after layer one of the permutation network.

4. The method of claim 1 wherein the error correcting code module comprises one of: a Hamming(7, 4) error correcting code module; a Reed-Muller error correction code module; a Reed-Solomon error correction code module; and a Hamming(15, 11) error correction code module.

5. The method according to claim 1 wherein the value g is received from a headend, thereby ensuring that the headend and the integrated circuit use the same value g to derive the secondary secret.

6. The method according to claim 1 wherein the function which receives g as an input comprises a hash function, g being input into the hash function prior to being input into the permutation network.

7. The method according to claim 1 and wherein the function which receives g as an input comprises a control circuit which comprises the same number of levels as the permutation network, the control circuit receiving the bits which comprise g as input bits, and output a bit value which is input as the control bit to a parallel level comprised in the permutation network.

8. The method according to claim 7 wherein the function which receives g as an input comprises a hash function and the control network, g being input into a hash function, the output of the hash function being input into the control network, the control network outputting a bit value which is input as the control bit to a parallel level comprised in the permutation network.

9. The method of claim 6 wherein additional arbitrarily selected bits comprise additional inputs to both of the error correction module and the hash function.

10. The method according to claim 6 and further comprising inputting a plurality of arbitrarily selected bits as additional inputs to the hash function and also as additional inputs to the error correcting code module.

11. A device comprising apparatus operative to execute the method of claim 1.

12. A headend comprising apparatus operative to execute the method of claim 1.

13. A system for deriving a secondary secret from a root secret, the system comprising:
   a. a reserved memory buffer comprised in an integrated circuit, the memory buffer being large enough to contain all of the bits which will comprise the secondary secret;
   b. a plurality of bits which are received from the root secret, the root secret being stored in a secure memory of the integrated circuit;
   c. a permutation network into which the plurality of bits from the root secret and at least one control bit are input, thereby producing a multiplicity of output bits, the at least one control bit comprising one of:

one bit of a value g; and one bit an output of a function which receives g as an input;

d. a plurality of logic gates which receive the multiplicity of output bits from the permutation network and into which the multiplicity of output bits from the permutation network are input, thereby combining the multiplicity of output bits, wherein a fixed number of bits is output from the logic gates;

e. an error correcting code module into which the fixed number of bits output by the logic gates are input, the fixed number of bits output by the logic gates comprising a first group of intermediate output bits and a second group of intermediate output bits and receiving output bits from the error correcting code module, the output bits of the error correcting code module comprising the first group of intermediate output bits as changed by the error correcting code module, where the change depends on the second group of intermediate output bits;

f. a plurality of registers in the reserved memory buffer of which non-filled registers are filled with the first group of intermediate output bits as changed by the error correcting code module; and g. wherein the apparatus described in b-f is invoked until the entire secondary secret is derived, wherein invoking the apparatus described in b-f is performed in a single clock cycle of the integrated circuit.

* * * * *